US012742676B2

(12) United States Patent
Tsuji

(10) Patent No.: US 12,742,676 B2
(45) Date of Patent: Sep. 22, 2026

(54) CALIBRATION SYSTEM, CALIBRATION METHOD, AND COMPUTER-READABLE MEDIUM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 18/697,783

(22) PCT Filed: Oct. 26, 2021

(86) PCT No.: PCT/JP2021/039461
§ 371 (c)(1),
(2) Date: Apr. 2, 2024

(87) PCT Pub. No.: WO2023/073804
PCT Pub. Date: May 4, 2023

(65) Prior Publication Data
US 2025/0003790 A1 Jan. 2, 2025

(51) Int. Cl.
*G01H 9/00* (2006.01)

(52) U.S. Cl.
CPC .................................. *G01H 9/004* (2013.01)

(58) Field of Classification Search
CPC ...... B61L 1/06; B61L 1/20; B61L 1/02; B61L 1/04; B61L 1/003; G01V 1/16;
(Continued)

(56) References Cited

U.S. PATENT DOCUMENTS

2015/0166087 A1* 6/2015 Ernst .................... B61L 25/025 246/122 R
2016/0334543 A1* 11/2016 Nagrodsky .............. B61L 1/06
(Continued)

FOREIGN PATENT DOCUMENTS

CN 112629821 A 4/2021
JP H07-198471 A 8/1995
(Continued)

OTHER PUBLICATIONS

WO2020116022A1 (Year: 2020).*
(Continued)

*Primary Examiner* — Kara E. Geisel

(57) ABSTRACT

This calibration system includes: a moving body that moves within a predetermined region and generates a vibration signal; a vibration detection means, being provided within the predetermined region, for detecting a vibration signal generated in the predetermined region; a signal analysis means for analyzing the vibration signal detected by the vibration detection means, and calculating a position on the vibration detection means where the vibration detection means detects the vibration signal; and an association means for calibrating the vibration detection means at a predetermined timing by associating the position on the vibration detection means where the vibration detection means detects the vibration signal with a position in the predetermined region, based on a generation position and a generation time of the vibration signal generated by the moving body and the position on the vibration detection means where the vibration detection means detects the vibration signal and a detection time thereof.

1 Claim, 4 Drawing Sheets

(58) Field of Classification Search
CPC ........ G01V 1/13; G01V 1/22; G01V 2200/00; G01N 29/30; G01N 29/045; G01H 5/00
See application file for complete search history.

(56) References Cited

U.S. PATENT DOCUMENTS

| | | | | |
|---|---|---|---|---|
| 2018/0156757 | A1* | 6/2018 | Nagrodsky | G01N 29/12 |
| 2021/0140122 | A1* | 5/2021 | Wilczek | B61L 25/025 |
| 2021/0223095 | A1* | 7/2021 | Wakisaka | G01B 17/04 |
| 2021/0255005 | A1 | 8/2021 | Okamoto et al. | |
| 2024/0085180 | A1 | 3/2024 | Yano et al. | |

FOREIGN PATENT DOCUMENTS

| | | | | |
|---|---|---|---|---|
| JP | 2017-117492 | A | 6/2017 | |
| JP | 2020-052030 | A | 4/2020 | |
| JP | 2020-091183 | A | 6/2020 | |
| WO | WO-2020116022 | A1 * | 6/2020 | G01S 15/74 |
| WO | 2021/075145 | A1 | 4/2021 | |

OTHER PUBLICATIONS

Japanese Office Communication for JP Application No. 2023-555929 mailed on Dec. 24, 2024 with English Translation.
International Search Report for PCT Application No. PCT/JP2021/039461, mailed on Jan. 11, 2022.

* cited by examiner 1
1
1
1

CALIBRATION SYSTEM, CALIBRATION METHOD, AND COMPUTER-READABLE MEDIUM

This application is a National Stage Entry of PCT/JP2021/039461 filed on Oct. 26, 2021, the contents of all of which are incorporated herein by reference, in their entirety.

TECHNICAL FIELD

The present invention relates to a calibration system, a calibration method, and a computer-readable medium that calibrate a vibration detection means for detecting a vibration signal generated in a predetermined region.

BACKGROUND ART

A system that associates a position on a vibration detection means where the vibration detection means detects a vibration signal from a vibration source with a position in a predetermined region is known (for example, refer to Patent Literature 1).

CITATION LIST

Patent Literature

[Patent Literature 1] Japanese Unexamined Patent Application Publication No. 2020-052030

SUMMARY OF INVENTION

Technical Problem

However, in the above-described system, a vibration source that generates a vibration signal is fixed. Therefore, in a case where calibration is performed by associating a position on a vibration detection means where the vibration detection means detects a vibration signal with a position in a predetermined region, a range of the calibration may be limited.

An object of the present disclosure is to provide a calibration system, a calibration method, and a computer-readable medium that solve the problem described above.

Solution to Problem

One aspect of the present invention for achieving the above-described object is a calibration system including:

a moving body configured to move within a predetermined region and generate a vibration signal;

a vibration detection means, which is provided within the predetermined region, for detecting a vibration signal generated in the predetermined region;

a signal analysis means for analyzing the vibration signal detected by the vibration detection means, and calculating a position on the vibration detection means where the vibration detection means detects the vibration signal; and an association means for calibrating the vibration detection means at a predetermined timing by associating a position on the vibration detection means where the vibration detection means detects the vibration signal with a position in the predetermined region, based on a generation position and a generation time point of the vibration signal generated by the moving body and the position on the vibration detection means where the vibration detection means detects the vibration signal and a detection time point thereof.

One aspect of the present invention for achieving the above-described object is a calibration method including:

a step in which a moving body moves within a predetermined region and generates a vibration signal;

a step of detecting a vibration signal generated within the predetermined region by using a vibration detection means;

a step of analyzing the vibration signal detected by the vibration detection means and calculating a position on the vibration detection means where the vibration detection means detects the vibration signal; and a step of calibrating the vibration detection means at a predetermined timing by associating a position on the vibration detection means where the vibration detection means detects the vibration signal with a position in the predetermined region, based on a generation position and a generation time point of the vibration signal generated by the moving body and the position on the vibration detection means where the vibration detection means detects the vibration signal and a detection time point thereof.

One aspect of the present invention for achieving the above-described object is a non-transitory computer-readable medium storing a program that causes a computer to execute:

processing of analyzing a vibration signal detected by a vibration detection means in a predetermined region, and calculating a position on the vibration detection means where the vibration detection means detects the vibration signal; and processing of calibrating the vibration detection means at a predetermined timing by associating a position on the vibration detection means where the vibration detection means detects the vibration signal with a position in the predetermined region, based on a generation position and a generation time point of the vibration signal generated by the moving body and the position on the vibration detection means where the vibration detection means detects the vibration signal and a detection time point thereof.

Advantageous Effects of Invention

According to the present disclosure, it is possible to provide a calibration system, a calibration method, and a computer-readable medium that solve the above-described problem.

EXAMPLE EMBODIMENT

First Example Embodiment

Hereinafter, example embodiments of the present invention are described with reference to the drawings. A calibration system according to the present example embodiment performs calibration of an optical fiber. The optical fiber is provided in a predetermined region, and detects a vibration signal generated in the predetermined region. The predetermined region is, for example, a factory, a facility, a seabed, or the like.

Figure 1:
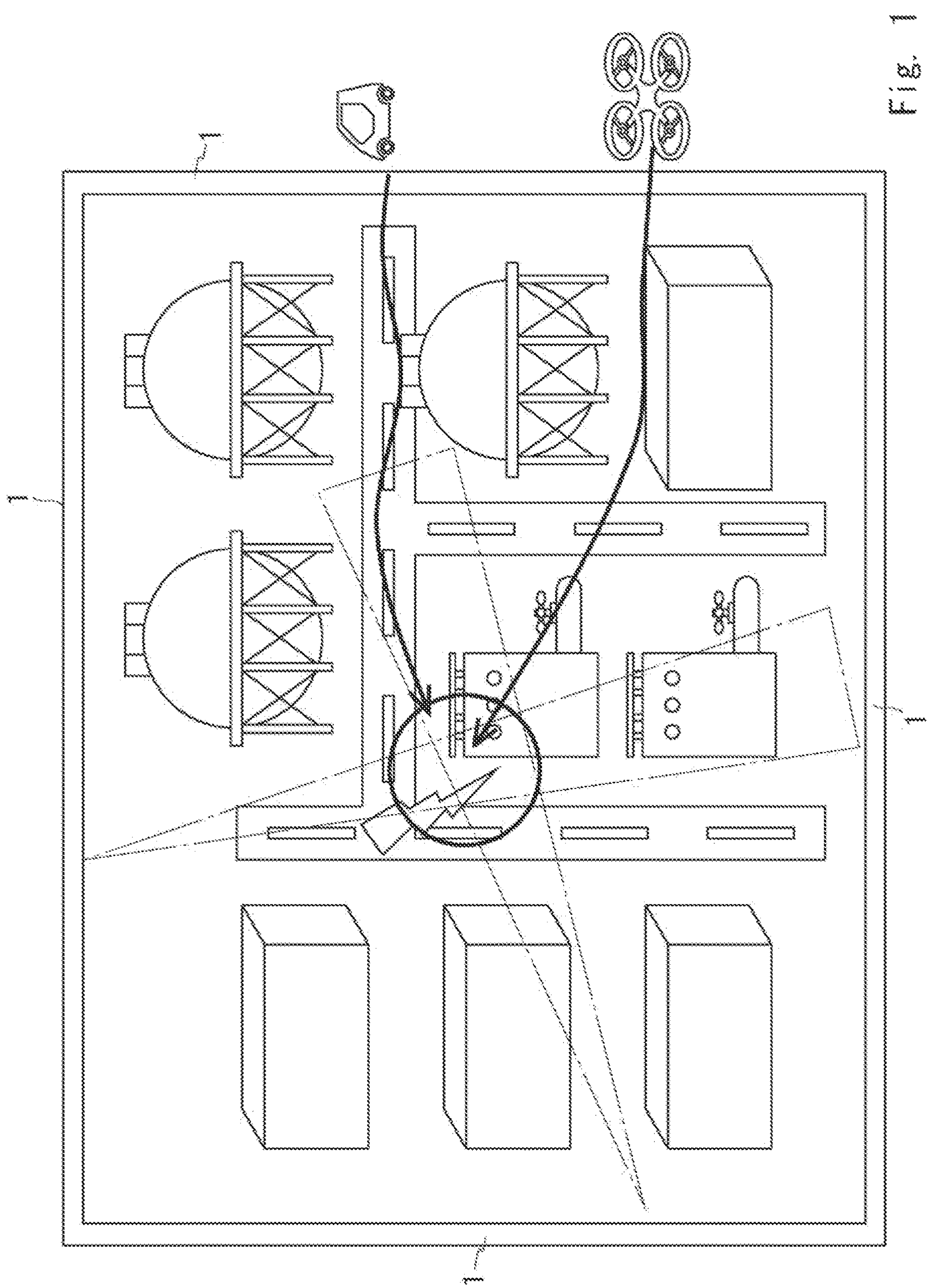
FIG. 1 is a diagram illustrating an optical fiber according to example embodiments.

The optical fiber is a specific example of a vibration detection means. For example, as illustrated in FIG. 1, an optical fiber 1 is laid along the outer periphery of a facility.

An optical fiber sensor is provided at an end portion of the optical fiber 1. The optical fiber sensor measures a strain $\Delta L$ of the optical fiber 1 through a phase difference $\Delta\varphi$ of backscattered light in a gauge length segment. The optical fiber operates as an independent vibration/acoustic sensor in each gauge length segment. The optical fiber sensor transmits a pulsed optical signal to the optical fiber 1 and receives a reflected signal from each measurement point on the optical fiber 1.

The optical fiber sensor may detect a direction of a vibration source generated in the facility as an angular range from each measurement point on the optical fiber 1, by detecting a change in the vibration signal due to vibration (sound or the like) from the surrounding environment, based on the reflection signal from each measurement point on the optical fiber 1. Then, the optical fiber sensor estimates a position where the angular range from each measurement point overlaps as a position of the vibration source. In such a way, when any event occurs in the facility, the position of the vibration source may be detected.

Incidentally, the optical fiber sensor itself is capable of detecting a position on the optical fiber 1 where the optical fiber 1 has detected vibration, such as, for example, detecting how far the position is from an end point (optical fiber sensor) of the optical fiber 1. However, such a detected position alone does not clarify where the detected position is in the facility (a position in the facility).

Therefore, the calibration system according to the present example embodiment performs calibration of the optical fiber 1 by associating the position on the optical fiber 1 where the optical fiber 1 has detected the vibration signal with a position in the facility (in the predetermined region).

The association of the optical fiber 1 is performed at the time of installation of the optical fiber 1. However, there is a possibility that the association may change after the installation, due to displacement of the installation position of the optical fiber 1, caused by damage of the installation location, natural disasters such as typhoons and earthquakes, and the like.

Meanwhile, the calibration system according to the present example embodiment calibrates the optical fiber 1 at a predetermined timing by causing the moving body to generate a vibration signal.

This makes it possible to appropriately calibrate the optical fiber 1 at a predetermined timing when the association of the optical fiber 1 changes. Further, since the moving body is able to move to a desired position and generate a vibration signal, the range of the optical fiber 1 to be calibrated is not limited, and the calibration of the optical fiber 1 may be performed in a wider range.

Figure 2:
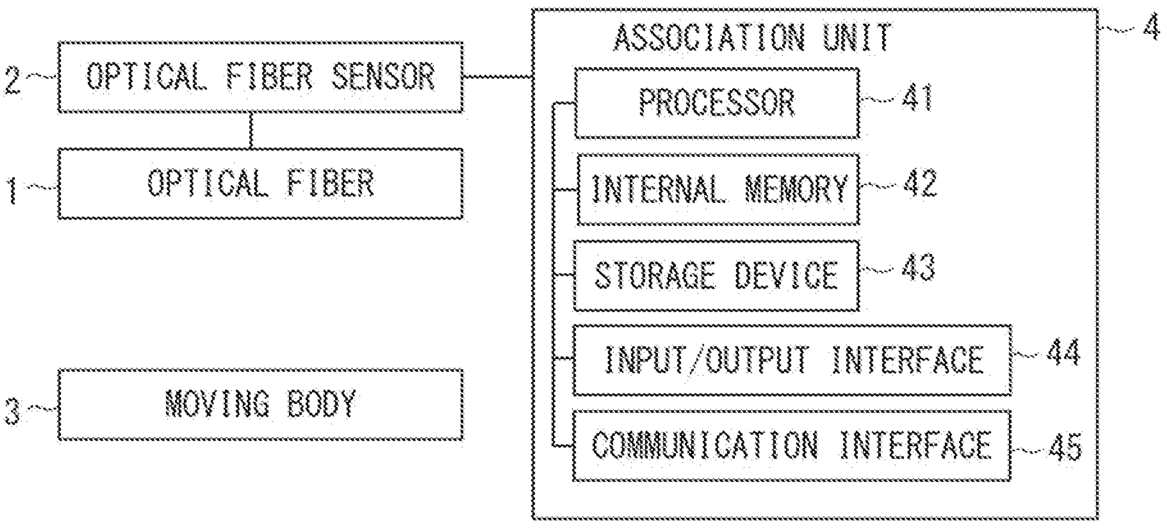
FIG. 2 is a block diagram illustrating a schematic system configuration of a calibration system according to the example embodiments.

Herein, a schematic system configuration of the calibration system according to the present example embodiment is described. FIG. 2 is a block diagram illustrating a schematic system configuration of the calibration system according to the present example embodiment.

A calibration system 10 according to the present example embodiment includes the optical fiber 1, an optical fiber sensor 2, a moving body 3 configured to generate a vibration signal, and an association unit 4 configured to calibrate the optical fiber 1.

The optical fiber 1 is provided in a predetermined region and detects a vibration signal generated in the predetermined region. The optical fiber sensor 2 is a specific example of a signal analysis means. The optical fiber sensor 2 analyzes the vibration signal detected by the optical fiber 1, and calculates the position of the optical fiber 1 where the optical fiber 1 has detected the vibration signal. The optical fiber sensor 2 transmits the position of the optical fiber 1 where the optical fiber 1 has detected the vibration signal and a detection time point at which the vibration signal was detected to the association unit 4 via wireless communication or the like.

The moving body 3 moves within the predetermined region and generates a vibration signal. The moving body 3 may travel within the predetermined region at a predetermined cycle. The moving body 3 is, for example, an autonomous drone, a mobile robot, a vehicle, or the like. The vibration signal is, for example, an operation sound generated when the moving body 3 operates, a sound output from a speaker provided in the moving body 3, or the like.

In order to clearly distinguish between the vibration signal and the sound of the surrounding environment, it is preferable that the moving body 3 generates a vibration signal including a specific frequency component, or a vibration signal the frequency and the phase of which is changed in time. Such a vibration signal may be, for example, a frequency modulated continuous wave (FMCW) signal.

As described above, in a case where an operating sound is generated as the vibration signal, it is preferable that the moving body 3 periodically changes characteristics such as frequency components in time, in order to more clearly distinguish the vibration signal from the sound of the surrounding environment. For example, the moving body 3 may operate to generate a vibration signal of a predetermined pattern. More specifically, the moving body 3 may generate a vibration signal of a predetermined pattern by turning in situ.

When the vibration signal is generated, the moving body 3 transmits information relating to the generation position and the generation time point of the vibration signal to the association unit 4 via wireless communication or the like. The generation position of the vibration signal is, for example, a position in a world coordinate system using latitude and longitude, or a position in a coordinate system using a specific location in the predetermined region as the coordinate origin.

The moving body 3 may perform self-position estimation based on map information, and distance information detected by a distance sensor such as a camera or light detection and ranging (LiDAR), and transmit the estimated self-position as the generation position of the vibration signal to the association unit 4.

The moving body 3 may detect the self-position by using a global navigation satellite system (GNSS), a radio frequency identification (RFID), a beacon, route information, and the like, and transmit the detected self-position as the generation position of the vibration signal to the association unit 4.

The association unit 4 is a specific example of an association means. The association unit 4 has a hardware configuration of an ordinary computer including, for example, a processor 41 such as a central processing unit (CPU) or a graphics processing unit (GPU), an internal memory 42 such as a random access memory (RAM) or a read only memory (ROM), a storage device 43 such as a hard disk drive (HDD) or a solid state drive (SSD), an input/output interface 44 for connecting peripheral devices such as a display, and a communication interface 45 for communicating with an external device.

The association unit 4 calibrates the optical fiber 1 at a predetermined timing by associating the position on the optical fiber 1 where the optical fiber 1 has detected the vibration signal with a position in the predetermined region, based on the generation position and the generation time point of the vibration signal generated by the moving body 3 and the position on the optical fiber 1 where the optical fiber 1 has detected the vibration signal and the detection time point thereof.

For example, the association unit 4 geometrically calculates the position in the predetermined region where the optical fiber 1 has detected the vibration signal, based on the generation position and the generation time point of the vibration signal generated by the moving body 3, and the position on the optical fiber 1 where the optical fiber 1 has detected the vibration signal (the position of the measurement point on the optical fiber 1) and the detection time point thereof.

For example, the association unit 4 calculates an arrival time at which the vibration signal from the moving body 3 arrives at the detection position (measurement point) on the optical fiber 1, based on the generation time point of the vibration signal generated by the moving body 3 and the detection time point at which the optical fiber 1 detected the vibration signal. The association unit 4 calculates the distance between the moving body 3 and the measurement point on the optical fiber 1 by multiplying the arrival time by the speed (such as sound speed) of the vibration signal.

The moving body 3 generates vibration signals at a plurality of movement points while moving. The optical fiber 1 receives a vibration signal from the moving body 3 at the measurement point. The association unit 4 calculates the distance between each of the above-described movement points of the moving body 3 and the measurement point of the optical fiber 1.

The association unit 4 is able to calculate the position in the predetermined region where the optical fiber 1 has detected the vibration signal, by determining the intersection point of circles centered on the movement points (the positions where the vibration signal is generated) of the moving body 3 and having the above-described calculated distance as the radius.

The association unit 4 may store, in, for example, the internal memory 42, association information in which the position on the optical fiber 1 where the optical fiber 1 has detected the vibration signal is associated with a position in the predetermined region as described above.

Figure 3:
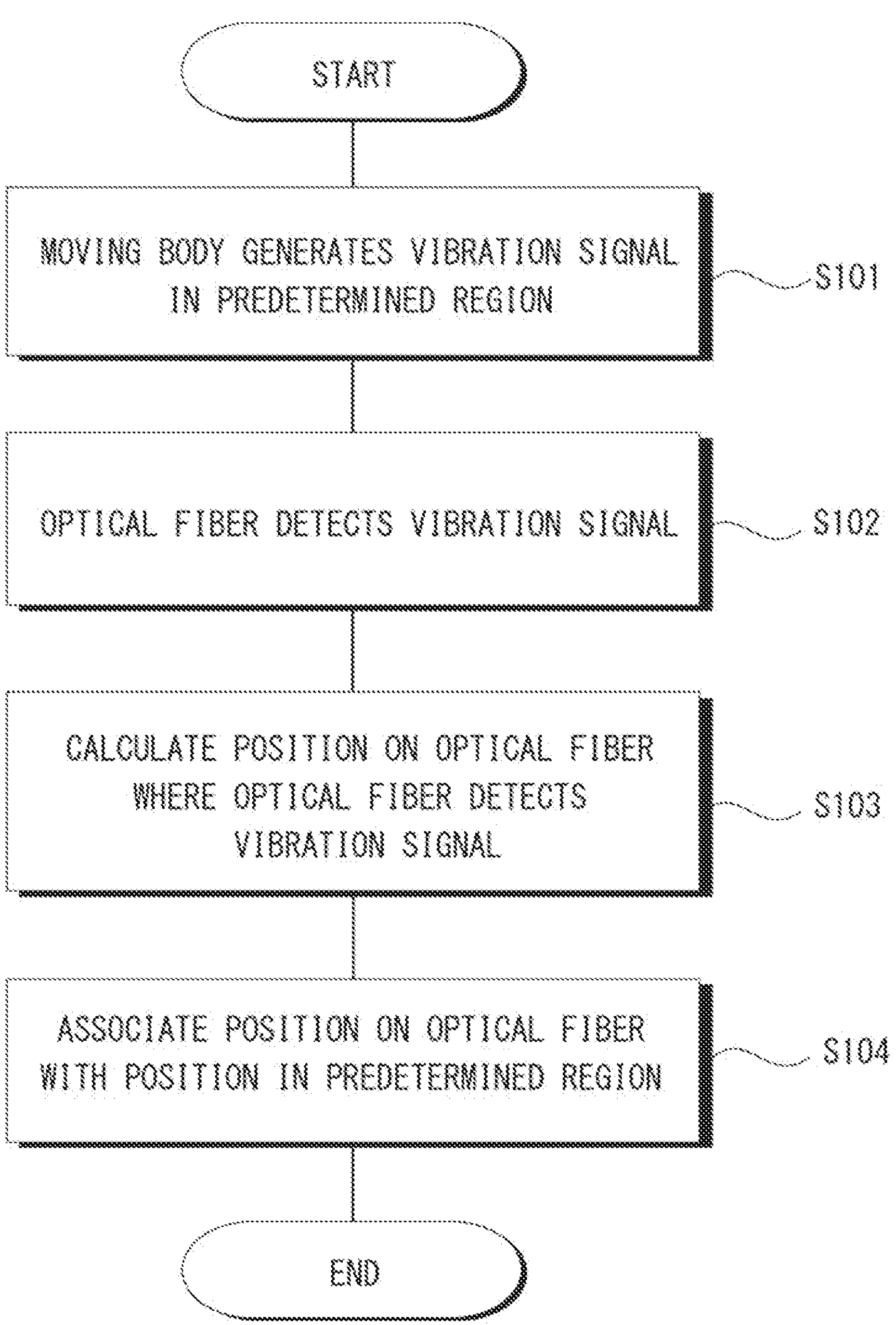
FIG. 3 is a flowchart illustrating a flow of a calibration method according to the example embodiments.

Next, a calibration method according to the present example embodiment is described. FIG. 3 is a flowchart illustrating a flow of the calibration method according to the present example embodiment.

The moving body 3 moves within a predetermined region and generates a vibration signal (step S101). The optical fiber 1 detects the vibration signal generated in the predetermined region (step S102).

The optical fiber sensor 2 analyzes the vibration signal detected by the optical fiber 1, and calculates a position on the optical fiber 1 where the optical fiber 1 has detected the vibration signal (step S103).

The association unit 4 calibrates the optical fiber 1 at a predetermined timing, by associating the position on the optical fiber 1 where the optical fiber 1 has detected the vibration signal with a position in the predetermined region, based on the generation position and the generation time point of the vibration signal generated by the moving body 3 and the position on the optical fiber 1 where the optical fiber 1 has detected the vibration signal and the detection time point thereof (step S104).

In the above-described example embodiment, the vibration detection means is the optical fiber 1, but is not limited thereto. The vibration detection means may be, for example, a microphone or a vibration sensor.

As described above, in the present example embodiment, the calibration system 10 calibrates the optical fiber 1 at a predetermined timing, by associating the position on the optical fiber 1 where the optical fiber 1 has detected the vibration signal with a position in the predetermined region, based on the generation position and the generation time point of the vibration signal generated by the moving body 3 and the position on the optical fiber 1 where the optical fiber 1 has detected the vibration signal and the detection time point thereof.

Thus, calibration of the optical fiber 1 may be appropriately performed at a predetermined timing at which the association of the optical fiber 1 changes. Further, since the moving body 3 may move to a desired position and generate a vibration signal, the range of the optical fiber 1 to be calibrated is not limited, and the calibration of the optical fiber 1 may be performed in a wider range.

Second Example Embodiment

A moving body 3 travels within a predetermined region at a predetermined cycle. An association unit 4 calibrates an optical fiber 1 at a predetermined timing, which is when a difference between the position of the moving body 3 calculated based on a vibration signal from the moving body 3 and association information and the position of the moving body 3 calculated by the moving body 3 is equal to or greater than a predetermined value.

Thereby, calibration of the optical fiber 1 may be appropriately performed at a timing when a deviation between the actual position of the moving body 3 and the position of the moving body 3 detected by an optical fiber sensor 2 becomes large.

As described above, the optical fiber sensor 2 calculates the position of the moving body 3, based on the vibration signal from the moving body 3 and the association information, and transmits the calculated position of the moving body 3 to the association unit 4. At the same time, as described above, the moving body 3 performs self-position estimation and the like, and transmits the estimated position of the moving body 3 to the association unit 4.

The association unit 4 calculates a difference between the position of the moving body 3 transmitted from the optical fiber sensor 2 and the position of the moving body 3 transmitted from the moving body 3. When it is determined that the calculated difference is equal to or more than the predetermined value and is large, the association unit 4 calibrates the optical fiber 1 by associating the position on the optical fiber 1 where the optical fiber 1 has detected the vibration signal with a position in the predetermined region, as a predetermined timing. The predetermined value may be set in advance in the association unit 4. An optimum value obtained experimentally is set as the predetermined value.

Third Example Embodiment

Figure 4:
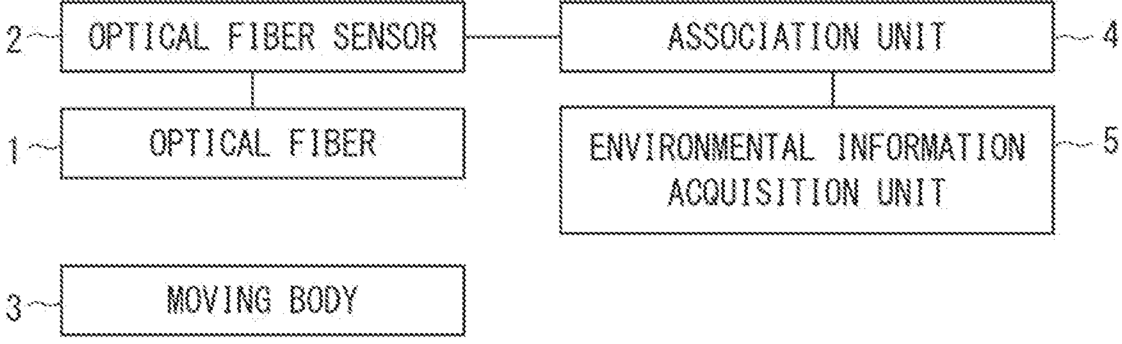
FIG. 4 is a block diagram illustrating a schematic system configuration of a calibration system according to the example embodiments.

FIG. 4 is a block diagram illustrating a schematic system configuration of a calibration system according to the present example embodiment. A calibration system 20 according to the present example embodiment further includes an environmental information acquisition unit 5 configured to acquire environmental information including at least one of weather information, disaster information, and construction information regarding a predetermined region. An association unit 4 and the environmental information acquisition unit 5 may be integrally configured.

The environmental information acquisition unit 5 is a specific example of an environmental information acquisition means. The weather information includes information relating to snow cover, heavy rain, typhoon, tornado, strong wind, and the like. The disaster information includes information relating to earthquake, flood, landslide, and the like. The construction information is information relating to a site, a schedule, and the like of a construction work.

For example, the environmental information acquisition unit 5 may acquire such information from a server of the Japan Meteorological Agency or a private company via a communication network. The information may be input to the environmental information acquisition unit 5 by the user.

There is a possibility that the above-described association may change due to a deviation in the installation position of the optical fiber 1, caused by a weather such as snow cover, heavy rain, typhoon, tornado, strong wind, a disaster such as earthquake, flood, landslide, or a construction work.

Meanwhile, in the present example embodiment, the association unit 4 determines a predetermined timing, based on the environmental information acquired by the environmental information acquisition unit 5, and calibrates the optical fiber 1 by associating the position on the optical fiber 1 where the optical fiber 1 has detected a vibration signal with a position in the predetermined region.

Thus, even when the installation position of the optical fiber 1 is deviated due to weather, disaster, construction work, or the like in the predetermined region, calibration of the optical fiber 1 may be performed appropriately at the predetermined timing.

For example, the environmental information acquisition unit 5 acquires earthquake information including seismic intensity information of the predetermined region from a server of the Japan Meteorological Agency via a communication network. The association unit 4 determines a predetermined timing in accordance with the earthquake information acquired by the environmental information acquisition unit 5, and calibrates the optical fiber 1.

Fourth Example Embodiment

In the present example embodiment, a moving body 3 may change the magnitude of a vibration signal, according to the distance from an optical fiber 1. As a result, the moving body 3 is able to optimally change the magnitude of the vibration signal, according to the distance from the optical fiber 1.

As the distance between the moving body 3 and the optical fiber 1 increases, the vibration signal of the moving body 3 hardly reaches the optical fiber 1, and there is a possibility that the accuracy of calibration of the optical fiber 1 decreases. Therefore, the moving body 3 increases the magnitude of the vibration signal, for example, as the distance from the optical fiber 1 increases.

In a case where the vibration signal generated by the moving body 3 is an operation sound of the moving body 3, the moving body 3 may change the magnitude of the vibration signal by changing the moving speed. This makes it possible to easily change the magnitude of the vibration signal. For example, as the moving speed of the moving body 3 increases, the magnitude of the vibration signal increases. In a case where the vibration signal is a sound output from a speaker provided in the moving body 3, the magnitude of the vibration signal may be changed by adjusting the volume of the speaker.

As illustrated in FIG. 1, an optical fiber sensor 2 detects a direction of a vibration source generated in a predetermined region as an angular range. Therefore, as the vibration source moves away from the optical fiber 1, the angular range of detection by the optical fiber 1 increases, and the detection accuracy of the optical fiber sensor 2 decreases.

Therefore, it is preferable that the moving body 3 is within a predetermined distance from the optical fiber 1, and generates a vibration signal while moving along a path passing near the optical fiber 1. As a result, the detection accuracy of the optical fiber sensor 2 may be improved, and the calibration of the optical fiber 1 may be performed with higher accuracy. Note that the predetermined distance may be set in advance in the moving body 3. In the predetermined processing, an experimentally acquired optimum value is set.

While certain example embodiments have been described, these example embodiments have been presented by way of example only, and are not intended to limit the scope of the invention. The novel example embodiments described herein may be embodied in a variety of other forms, and various omissions, substitutions and changes may be made without departing from the spirit of the invention. The example embodiments and modifications thereof fall within the scope and spirit of the invention, and also fall within the scope of the invention described in the claims and equivalents thereof.

The present invention may also achieve the processing illustrated in FIG. 3 by, for example, causing a processor to execute a computer program.

The program may be stored and provided to the computer by using various types of non-transitory computer-readable media. Non-transitory computer-readable media include various types of tangible storage media. Examples of non-transitory computer-readable media include magnetic storage media (e.g., flexible disks, magnetic tapes, and hard disk drives), magneto-optical storage media (e.g., magneto-optical disks), CD-read only memory (ROM), CD-R, CD-R/W, and semiconductor memories (e.g., mask ROM, programmable ROM (PROM), erasable PROM (EPROM), flash ROM, and random access memory (RAM)).

The program may be provided to the computer by various types of transitory computer-readable media. Examples of transitory computer-readable media include electrical signals, optical signals, and electromagnetic waves. The transitory computer-readable medium may provide the program to the computer via a wired communication path such as an electric wire and an optical fiber, or a wireless communication path.

The association unit 4 and the environmental information acquisition unit 5 according to the above-described example embodiments may be achieved not only by a program but also by dedicated hardware such as an application specific integrated circuit (ASIC) and a field-programmable gate array (FFPGA), in part or in whole.

REFERENCE SIGNS LIST

1 OPTICAL FIBER
2 OPTICAL FIBER SENSOR
3 MOVING BODY

4 ASSOCIATION UNIT
5 ENVIRONMENTAL INFORMATION ACQUISITION UNIT
10 CALIBRATION SYSTEM
20 CALIBRATION SYSTEM
41 PROCESSOR
42 INTERNAL MEMORY
43 STORAGE DEVICE
44 INPUT/OUTPUT INTERFACE
45 COMMUNICATION INTERFACE

What is claimed is:

1. A calibration method comprising:
a step in which a moving body moves within a predetermined region and generates a vibration signal;
a step of detecting a vibration signal generated within the predetermined region by using optical fiber;
a step of analyzing the vibration signal detected by the optical fiber and calculating a position on the optical fiber where the optical fiber detects the vibration signal; and
a step of calibrating the optical fiber at a predetermined timing by associating the position on the optical fiber where the optical fiber detects the vibration signal with a position in the predetermined region, based on a generation position and a generation time point of the vibration signal generated by the moving body and the position on the optical fiber where the optical fiber detects the vibration signal and a detection time point thereof,
wherein the moving body increases the magnitude of the vibration signal as the distance from the optical fiber increases.

* * * * *